(12) United States Patent
Berning et al.

(10) Patent No.: US 9,850,628 B2
(45) Date of Patent: *Dec. 26, 2017

(54) ROAD MILLING MACHINE FOR WORKING ROAD OR GROUND SURFACES

(71) Applicant: Wirtgen GmbH, Windhagen (DE)

(72) Inventors: Christian Berning, Brühl (DE); Oliver Thiel, Hochscheid (DE); Roland Lull, Königswinter (DE); Cyrus Barimani, Königswinter (DE)

(73) Assignee: Wirtgen GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/196,157

(22) Filed: Jun. 29, 2016

(65) Prior Publication Data

US 2016/0369459 A1 Dec. 22, 2016

Related U.S. Application Data

(63) Continuation of application No. 14/268,497, filed on May 2, 2014, now Pat. No. 9,382,676.

(30) Foreign Application Priority Data

May 8, 2013 (DE) .......................... 10 2013 208 539

(51) Int. Cl.
 *E01C 23/088* (2006.01)
 *E01C 23/12* (2006.01)
 (Continued)

(52) U.S. Cl.
 CPC .............. *E01C 23/088* (2013.01); *B62D 3/02* (2013.01); *B62D 7/026* (2013.01); *B62D 7/04* (2013.01); *B62D 7/20* (2013.01); *E01C 23/127* (2013.01)

(58) Field of Classification Search
 CPC ........ E01C 23/088; E01C 23/127; B62D 5/12
 (Continued)

(56) References Cited

U.S. PATENT DOCUMENTS 3,398,808 A 8/1968 Heckenhauer
3,606,827 A 9/1971 Miller et al.
(Continued)

FOREIGN PATENT DOCUMENTS

CN 201999061 U 10/2001
DE 4334742 A1 4/1995
(Continued)

OTHER PUBLICATIONS

European Search Report in corresponding European Patent Application EP 14 16 6468, dated Sep. 5, 2014, 3 pp (not prior art).
(Continued)

*Primary Examiner* — David J Bagnell
*Assistant Examiner* — Michael A Goodwin
(74) *Attorney, Agent, or Firm* — Lucian Wayne Beavers; Patterson Intellectual Property Law, PC

(57) ABSTRACT

A road milling machine includes a machine frame, front wheels or tracks, rear wheels or tracks, and a milling drum supported from the machine frame between the rear wheels or tracks. The front wheels or tracks are mounted on pivoting columns. Steering levers are attached to the pivoting columns. A steering tie rod includes a connecting part and a projecting arm. The connecting part is connected to the steering levers. A steering cylinder is connected to a free end of the projecting arm.

35 Claims, 6 Drawing Sheets

(51) Int. Cl.
*B62D 7/02* (2006.01)
*B62D 7/04* (2006.01)
*B62D 7/20* (2006.01)
*B62D 3/02* (2006.01)

(58) Field of Classification Search
USPC .................................................. 180/436, 439
See application file for complete search history.

(56) References Cited

U.S. PATENT DOCUMENTS

| | | | |
|---|---|---|---|
| 3,895,843 A | 7/1975 | Wall et al. | |
| 3,971,594 A | 7/1976 | Wirtgen | |
| 3,990,534 A | 11/1976 | Weisgerber | |
| 4,270,801 A | 6/1981 | Swisher, Jr. et al. | |
| 5,577,808 A | 11/1996 | Gilbert | |
| 5,921,343 A * | 7/1999 | Yamakaji | B60K 17/30 |
| | | | 180/253 |
| 6,106,073 A | 8/2000 | Simons et al. | |
| 6,116,645 A | 9/2000 | Benassi | |
| 6,286,615 B1 | 9/2001 | Bitelli | |
| 6,435,766 B1 | 8/2002 | Titford | |
| 6,510,917 B2 | 1/2003 | Cole | |
| 6,675,927 B1 | 1/2004 | Enmeiji et al. | |
| 7,547,028 B1 * | 6/2009 | Blaszynski | B62D 7/20 |
| | | | 280/89.12 |
| 7,854,293 B2 * | 12/2010 | Derby, V | A01D 34/006 |
| | | | 180/436 |
| 9,194,088 B2 | 11/2015 | Berning et al. | |
| 2003/0178884 A1 | 9/2003 | Fischer et al. | |
| 2010/0021234 A1 | 1/2010 | Willis et al. | |
| 2011/0150572 A1 | 6/2011 | Fritz et al. | |

FOREIGN PATENT DOCUMENTS

| | | | |
|---|---|---|---|
| DE | 29924566 U1 | 1/2004 | |
| EP | 0836659 B2 | 3/2005 | |
| WO | 9742377 A1 | 11/1997 | |
| WO | 9847756 A1 | 10/1998 | |

OTHER PUBLICATIONS

European Search Report in European Patent Application EP 14 16 6732, dated Sep. 8, 2014, 3 pp (not prior art).
Office Action in previously co-pending U.S. Appl. No. 14/268,481 dated May 12, 2015, 6 pp. (not prior art).
EPO Office Action in corresponding European Patent Application No. 14166468.0-1604, dated Apr. 7, 2016, 4 pp (not prior art).

* cited by examiner

ROAD MILLING MACHINE FOR WORKING ROAD OR GROUND SURFACES

BACKGROUND OF THE INVENTION

1. Field of the Invention

The invention relates to a road milling machine for working road or ground surfaces.

2. Description of the Prior Art

Such road milling machines are known, for example, from EP 0 836 659.

With such road construction machinery, in particular small milling machines, good manoeuvrability of the road milling machine is of the essence. Such road milling machine must not only be suitable for straight-ahead travel and normal cornering procedures, for example, but must additionally be able to follow the course of narrow bends, for example, when negotiating around traffic islands or a manhole cover.

In the known small milling machines, the milling drum therefore ends nearly flush with one outer side of the machine frame, the so-called zero-clearance side. Due to this arrangement, it is possible to mill very close along obstacles. It has also already been known for this purpose to pivot the rear wheel located on the zero-clearance side inwards, relative to the zero-clearance side, from an outer end position to an inner end position in front of the milling drum.

The possibility to follow the course of very narrow bends on said zero-clearance side is of particular importance as it enables highly precise milling operations to be performed around very small obstacles. It has therefore already been known in such road milling machines to design differently large steering angles for a cornering procedure to the inside or to the outside respectively, relative to said zero-clearance side, in particular to design an especially large steering angle for a cornering procedure to the outside.

It is understood that, when the manoeuvrability is improved, the range of possible applications and the economic efficiency of such road milling machine can be improved.

SUMMARY OF THE INVENTION

It is therefore the object of the present invention to improve the manoeuvrability of a road milling machine, in particular of a small milling machine.

The above object is achieved, according to the invention, in that the wheel brackets of the wheels or crawler tracks of the front axle are coupled to one another via a connecting part for synchronous adjustment of the steering angles, and that said connecting part forms a steering tie rod together with an arm projecting from the connecting part, where the arm of said steering tie rod is coupled to the free end of at least one steering cylinder.

Such design of the connecting part enables an increase of the adjustable maximum steering angle of the wheels or crawler tracks while simultaneously allowing a compact machine design.

For a steering movement in which the zero-clearance side of the road milling machine is on the inside, it is intended for the wheel brackets to be coupled, via the connecting part, in such a fashion that, in the vertical plane of the rear axle or the extension of the same in the area of the rear wheel or crawler track, the center of rotation of both front wheels or crawler tracks is arranged as close as possible to the zero-clearance side.

As the milling drum axis lies in the same vertical plane as the rear axle of the rear wheels or crawler tracks, this arrangement enables the milling, with the front end of the milling drum on the zero-clearance side, of narrow bend radii, for example, around manhole covers.

The increase of the maximum possible steering angle enables the distance of the current center of rotation to the front end of the milling drum located on the inner side of the bend to be shortened, thereby allowing narrower bend radii to be driven.

In this design, it is intended for the arm of the steering tie rod to extend between the pivoting columns of the wheels or crawler tracks away from the connecting part, with the connecting part and the steering cylinder being arranged on opposite sides, as seen in the direction of travel, relative to an imagined connecting line of the pivoting axes.

It is preferably intended for the wheels or crawler tracks to be steerable between two steering angle end positions for a direction of travel to the left or to the right, where the connecting part exhibits curved sections or cut-outs in such a fashion that, in the end positions, the connecting part maintains a distance from the respective pivoting axis that is larger than the radius of the respective pivoting column.

In a preferred embodiment, the arm of the steering tie rod projects essentially centrally from the connecting part. The initially central arrangement of the arm offers the advantage that collision freedom relative to the pivoting columns is enabled for a larger area. In front of the area of the pivoting columns as seen in the direction of travel, the arm may be of curved or angled design.

It is preferably intended for the arm of the steering tie rod projecting from the connecting part to extend behind the pivoting columns in an approximately parallel fashion to the steering cylinder and, at the free end, to be connected in an articulated fashion to a single steering cylinder. In this way, the respective points of force application are located on opposite sides relative to the pivoting columns.

It is preferably intended for the arm projecting from the connecting part to feature a width that ranges between the 0.5-fold and 0.97-fold, preferably between the 0.75-fold and 0.95-fold of the difference between the distance of the pivoting axes and the twofold radius of the pivoting columns.

The steering levers may be arranged at the pivoting columns in different angular positions relative to the direction of travel in such a fashion that different maximum steering angles result for a steering direction to the right or left.

The pivoting columns of the front axle may be mounted in a cross member.

The fixed point of the steering cylinder is preferably arranged at the machine frame or at the cross member.

In a preferred embodiment, the cross member may be pivotable, relative to the machine frame, about a swing axle extending in the direction of travel. In this manner, it is also possible for the wheels or crawler tracks of the front axle to run on different planes.

It is preferably intended for the rear wheel located on the zero-clearance side to be pivotable inwards, relative to the zero-clearance side, from an outer end position in which the wheel is beyond the zero-clearance side and the rear axles of both rear wheels are in alignment, to an inner end position in front of the milling drum.

It may be intended, as a minimum, for the rear wheel on the zero-clearance side to be steerable.

The steerability, possibly of both rear wheels but as a minimum of the rear wheel located on the zero-clearance side, likewise improves the manoeuvrability of the road milling machine. It is particularly advantageous when crawler tracks are used.

A particularly preferred embodiment intends for the wheels or crawler tracks of the front axle as seen in the direction of travel to be arranged offset to one another in such a fashion that the wheel on the inside relative to the steering direction, or the wheel or crawler track on the zero-clearance side is arranged in front of the neighbouring wheel or crawler track as seen in the direction of travel.

The offset arrangement of the wheels or crawler tracks offers the advantage that, on account of the offset, the steering geometry permits larger maximum steering angles to be adjusted, which allows a narrow bend radius to be driven. This improvement is of major advantage in particular when performing a cornering procedure in which the zero-clearance side is located on the inside.

Ultimately, the offset arrangement of the front wheels allows the bend radii of both front wheels to be matched to one another while at the same time reducing the distance of the current center of rotation from the front end of the milling drum. Matching the bend radii of both front wheels enables a more precise cornering procedure, and shortening the distance of the center of rotation to, for example, the front end of the milling drum on the zero-clearance side allows extremely narrow bend radii of up to 130 mm and less to be achieved. As a result, the road milling machine can practically turn on the spot.

The invention also enables a better manoeuvrability of the road milling machine than before to be achieved in the event of a required lengthening of the wheelbase.

Lengthening of the wheelbase may become necessary, among other things, due to the use of a new and more complex engine technology or the integration of additional components, for example, for the after-treatment of exhaust gases. These components require additional construction space but are necessary in order to comply with emission directives.

It is preferably intended for the offset between the pivoting axes of the front axle as seen in the direction of travel to be between 50 mm and 350 mm, preferably between 100 mm and 250 mm. Such offset in the arrangement of the pivoting axes of the wheels or crawler tracks of the front axle allows a significant increase of the maximum steering angles.

It is preferably intended for the steering angle to the outside of the wheel or crawler track located on the zero-clearance side to be adjustable up to a maximum steering angle in excess of 70°, preferably between 70° and 90°.

A preferred embodiment intends for the offset of the wheels or crawler tracks of the front axle to be chosen in such a fashion that the wheels or crawler tracks in the steering direction to the outside relative to the zero-clearance side both run in a single track.

This offers the advantage that the road milling machine can be turned on the spot, that is, essentially around the current center of rotation, thus allowing the milling of extremely narrow bend radii. Furthermore, this arrangement allows a more precise cornering procedure.

In a further embodiment, it may be intended for the cross member to be pivotable about a vertical axis. This feature enables the offset of the front wheels to be optionally provided either on the zero-clearance side or on the side opposite the zero-clearance side so that, in each case, the wheel located on the inside relative to the steering direction can be arranged in front of the neighbouring wheel. In this way, it can be achieved that the bend radii of the front wheels are matched to one another even when steering to the left relative to the zero-clearance side, which enables the distance between the front end of the milling drum facing away from the zero-clearance side and the center of rotation in the form of an axis of rotation extending essentially orthogonally to the ground surface to be likewise reduced further.

It is preferably intended for the wheel brackets to be coupled via the connecting part in such a fashion that, when steering to the outside relative to the zero-clearance side, the center of rotation exhibits a distance from the outer front end of the milling drum of less than 250 mm, preferably less than 150 mm.

For a cornering procedure in which the zero-clearance side is on the outside, it is intended for the wheel brackets to be coupled via the connecting part in such a fashion that, when steering to the inside relative to the zero-clearance side, the center of rotation of both front wheels or crawler tracks exhibits, on the extension of the rear axle, a distance from the inner front end of the milling drum that is smaller than the wheelbase, preferably smaller than 2,000 mm.

In the following, embodiments of the invention are explained in more detail with reference to the drawings.

BRIEF DESCRIPTION OF THE DRAWINGS

The following is shown.

DETAILED DESCRIPTION

Figure 1:
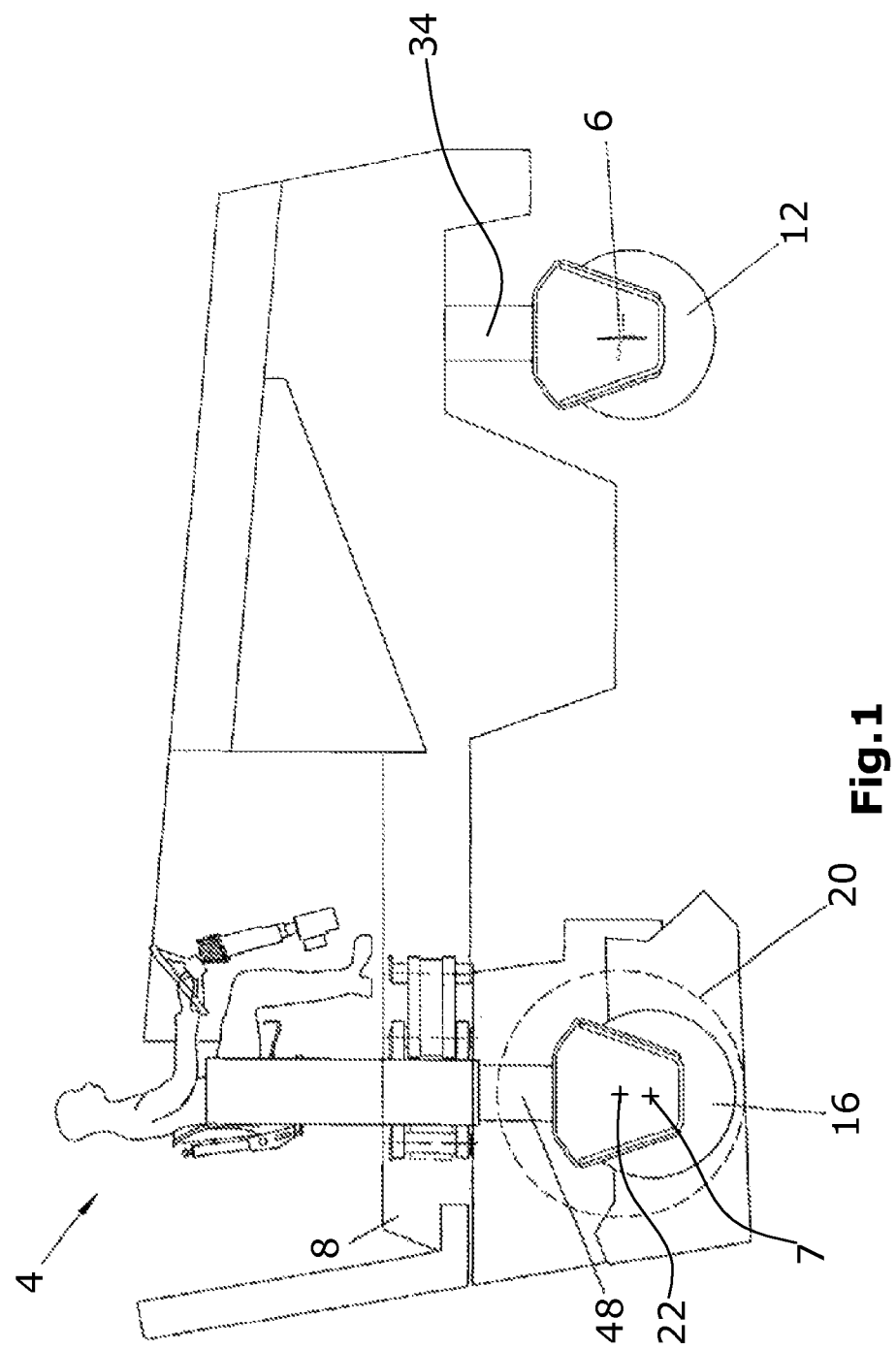
FIG. 1 a generic road milling machine in accordance with prior art.

FIG. 1 shows a road milling machine for milling off roadways with a self-propelled chassis comprising a steerable front axle 6 with two front wheels 10, 12 and two mutually independent rear wheels 14, 16. It is understood that the wheels 10 to 16 may be substituted, wholly or in part, by crawler tracks.

Figure 2:
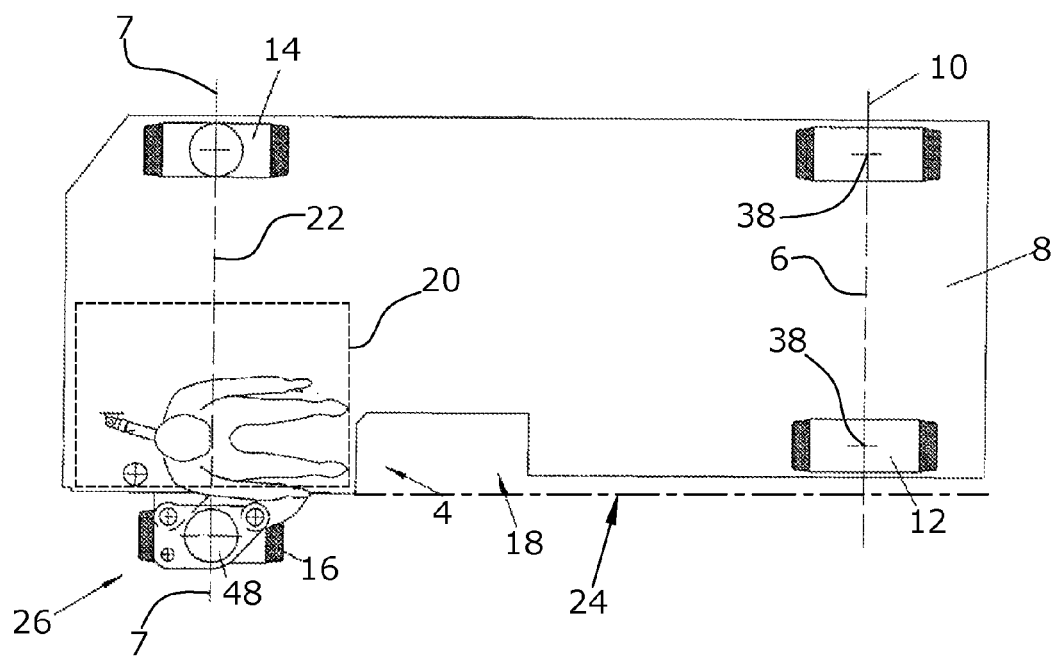
FIG. 2 a top view of the road milling machine shown in FIG. 1.

The chassis supports a machine frame 8, on which an operator's platform 4 is located on the so-called zero-clearance side 24 of the road construction machine in accordance with FIG. 2. The rear wheels 14, 16 are height-adjustable by means of lifting columns 48 in order to be able to use them to adjust the working depth of a milling drum 20.

With its front end on the zero-clearance side, the milling drum 20 is nearly flush with the zero-clearance side 24 of the machine frame so that working close to the edge is possible on the zero-clearance side 24 of the road milling machine. To this effect, the wheel 16 is pivoted inwards, from an outer end position 26 beyond the plane of the zero-clearance side, in front of the milling drum and into a cut-out 18 of the machine frame 8 so that the outer edge of the wheel 16 can end flush with the zero-clearance side 24 or even assume an end position further inside relative to the zero-clearance side 24. The rear wheel 16 or both rear wheels 14, 16 may be steerable.

As can best be inferred from FIG. 1, the milling drum axis 22 extends essentially in the same vertical plane as the axles 7 of the wheel 14 and of the wheel 16 in the outer end position 26.

The circle of engagement of the milling drum 20 ends close to the rear end of the machine frame 8 so that milling close to the edge is possible right up into corners.

Figure 3:
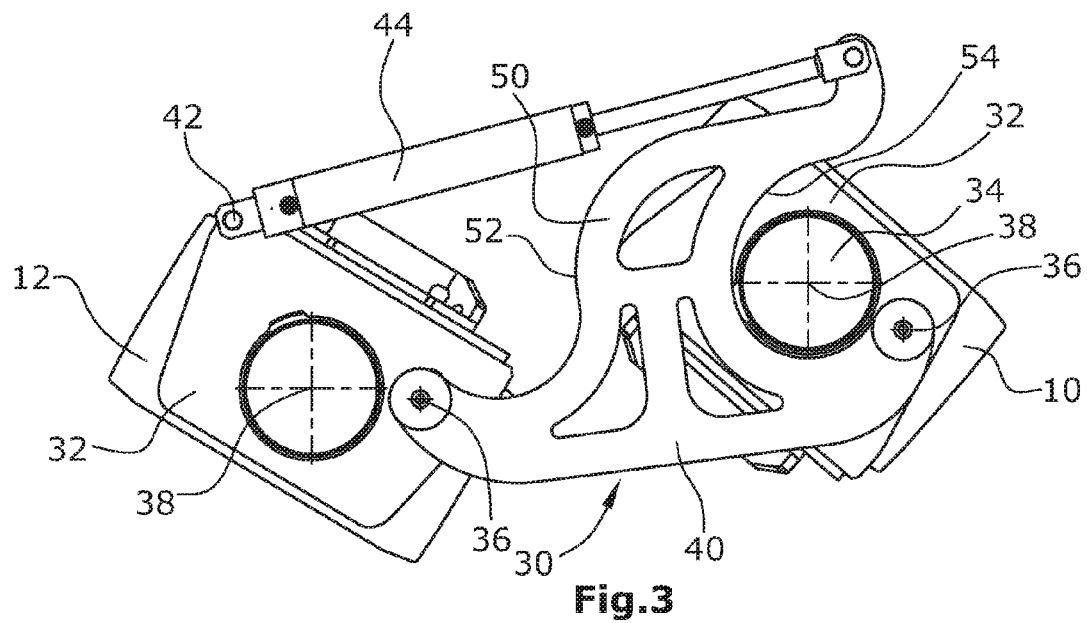
FIG. 3 a top view of an embodiment of a steering tie rod.

FIG. 3 shows a steering tie rod 30 with a connecting part 40 which connects the steering levers 36 of both front wheels 10, 12 in an articulated fashion. An arm 50 projects initially essentially centrally from and preferably orthogonally to said connecting part 40.

The wheel brackets 32 are each connected with pivoting columns 34, said pivoting columns 34 being mounted in a cross member 56 to pivot about one each pivoting axis 38.

The steering levers 36 are connected with the wheel brackets 32 in a permanent fashion.

The arm 50 projecting essentially orthogonally from the connecting part 40 exhibits, on the sides facing the pivoting columns 34, a curved contour 52, 54 that is adapted to the diameter of the pivoting columns 34 in order to be able to adjust maximum steering angles without causing any collision.

Above an imagined connecting line between the pivoting axes 38 of the pivoting columns 34, the arm 50 may be angled or curved in order to be connected, at its free end, to a steering cylinder 44 which transfers the force required for steering to the steering tie rod 30. The steering cylinder 44 is in turn directly or indirectly articulated at a fixed point 42 relative to the machine frame 4.

Figure 4:
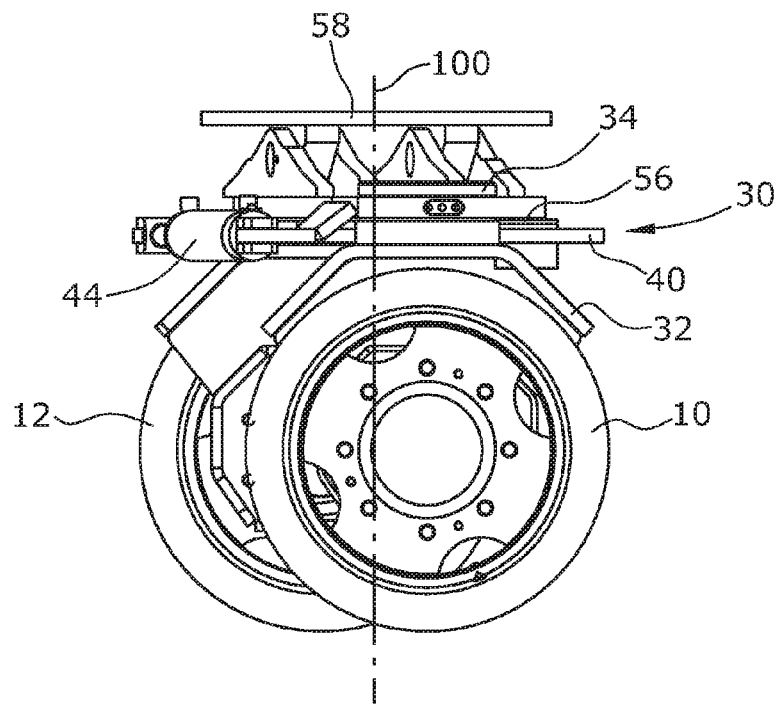
FIG. 4 a side view of the front axle.

FIG. 4 shows a side view of the front axle with wheels 10, 12 offset to one another, the pivoting columns 34 of said wheels 10, 12 being mounted in a cross member 56.

The cross member 56 is articulated at a plate 58 attached to the machine frame 8 in such a fashion that the cross member 56 may be pivotable, relative to the machine frame 8, about a swing axle extending in the direction of travel.

In an alternative embodiment, it may also be intended for the cross member 56 to be pivotable about a vertical axis 100 extending parallel to the pivoting axes 38 in such a fashion that the offset "d" can optionally be provided on the left or right as seen in the direction of travel so that, in each case, the wheel 10 or 12 located on the inside relative to the steering direction can be arranged in front of the neighbouring wheel as seen in the direction of travel.

Figure 5:
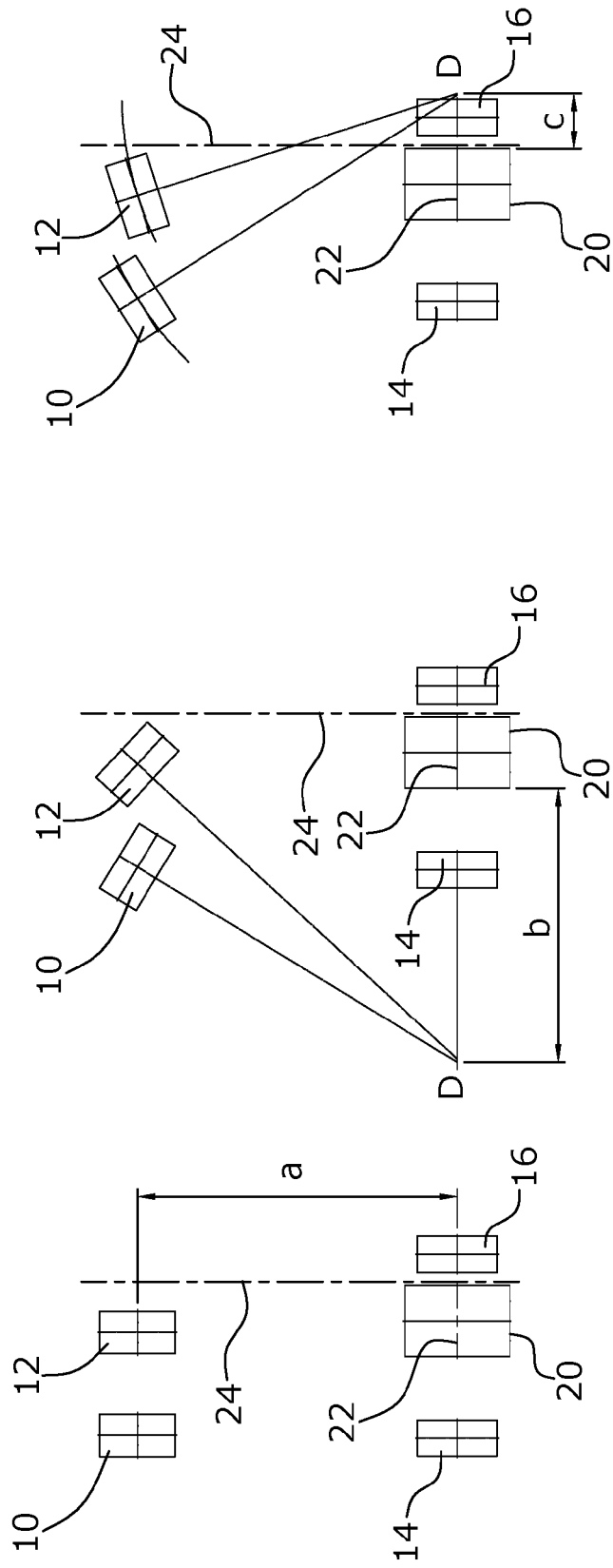
FIG. 5 a schematic illustration of the steering angles in a road milling machine according to FIG. 1, FIG. 6 a schematic illustration of the adjustable steering angles in a first embodiment of the invention, and FIG. 7 a schematic illustration of the adjustable steering angles in a further embodiment of the invention.

FIG. 5 shows an embodiment according to prior art together with the geometrical distances relevant for the milling operation. The left-hand illustration of FIG. 5 indicates the wheelbase "a" of the road milling machine. The middle illustration shows, as a characteristic relevant for the milling operation, the distance "b" of the center of rotation "D" from the front end of the milling drum 20 facing away from the zero-clearance side when adjusted to the maximum steering angle to the left.

The right-hand illustration of FIG. 5 shows the same situation when adjusted to the maximum steering angle to the right in which the zero-clearance side 24 is located on the inner side of the bend. Not only the adjustable maximum steering angle of the front wheels 10, 12 is of great importance in this arrangement but also the distance "c" of the center of rotation D to the front end of the milling drum 20 on the zero-clearance side 24. It is understood that a smaller distance "c" allows the milling of narrower bend radii. Moreover, a shortening of the distance "b", or a possibly required extension of the wheelbase "a" and simultaneous reduction of the distances "b" and "c", is also desirable.

Figure 6:
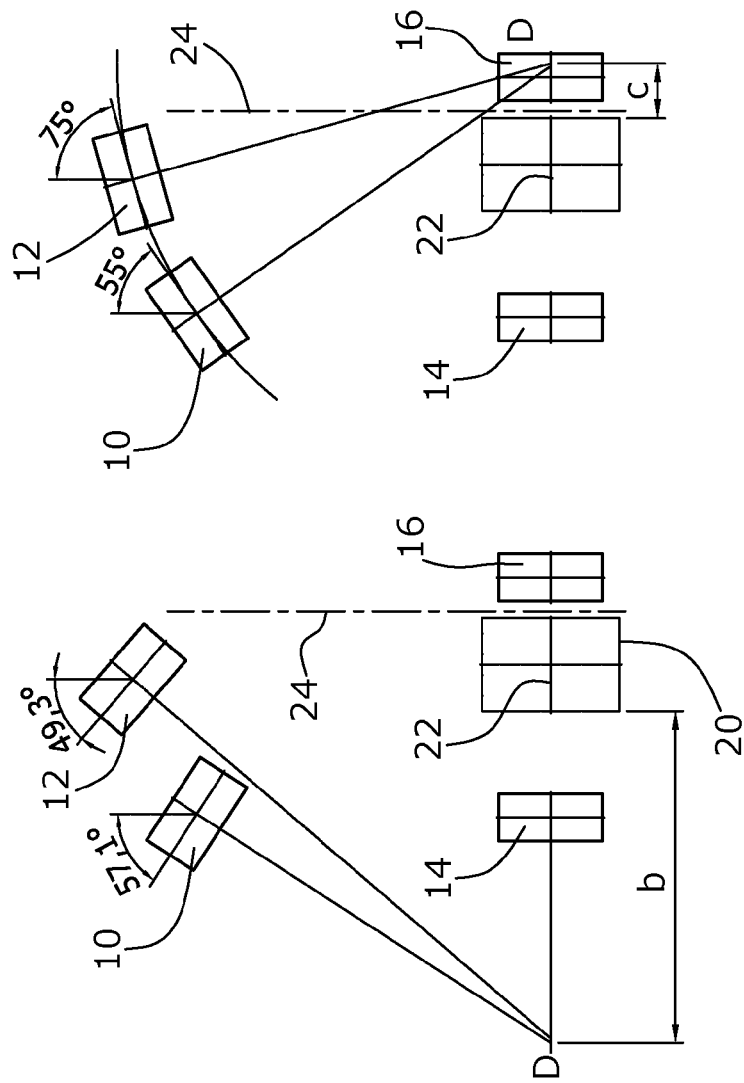

FIG. 6 shows an embodiment of the invention in which the front wheels 10, 12 are arranged offset to one another. The wheelbase "a" of the front right wheel 12 has been maintained while the front left wheel 10 is moved back by an offset "d". Said offset "d" may, for example, be in a range between 50 mm to 350 mm, preferably between 100 mm and 250 mm.

Firstly, said offset offers the advantage inferable from the middle illustration of FIG. 6 that the steering angle of the front right wheel 12 can be increased, which allows the distance "b" between the center of rotation and the left front end of the milling drum 20 to be shortened significantly, thus also improving the manoeuvrability of the road milling machine to the inside relative to the zero-clearance side 24.

It can be inferred from the right-hand illustration of FIG. 6 that the maximum steering angle can be increased to, for example, 75° as a result of the offset arrangement of the front wheels 10, 12, thus enabling the distance "c" of the center of rotation "D" to the front end of the milling drum 20 on the zero-clearance side 24 to be reduced significantly, that is, by approx. 20% in comparison with FIG. 5.

Figure 7:
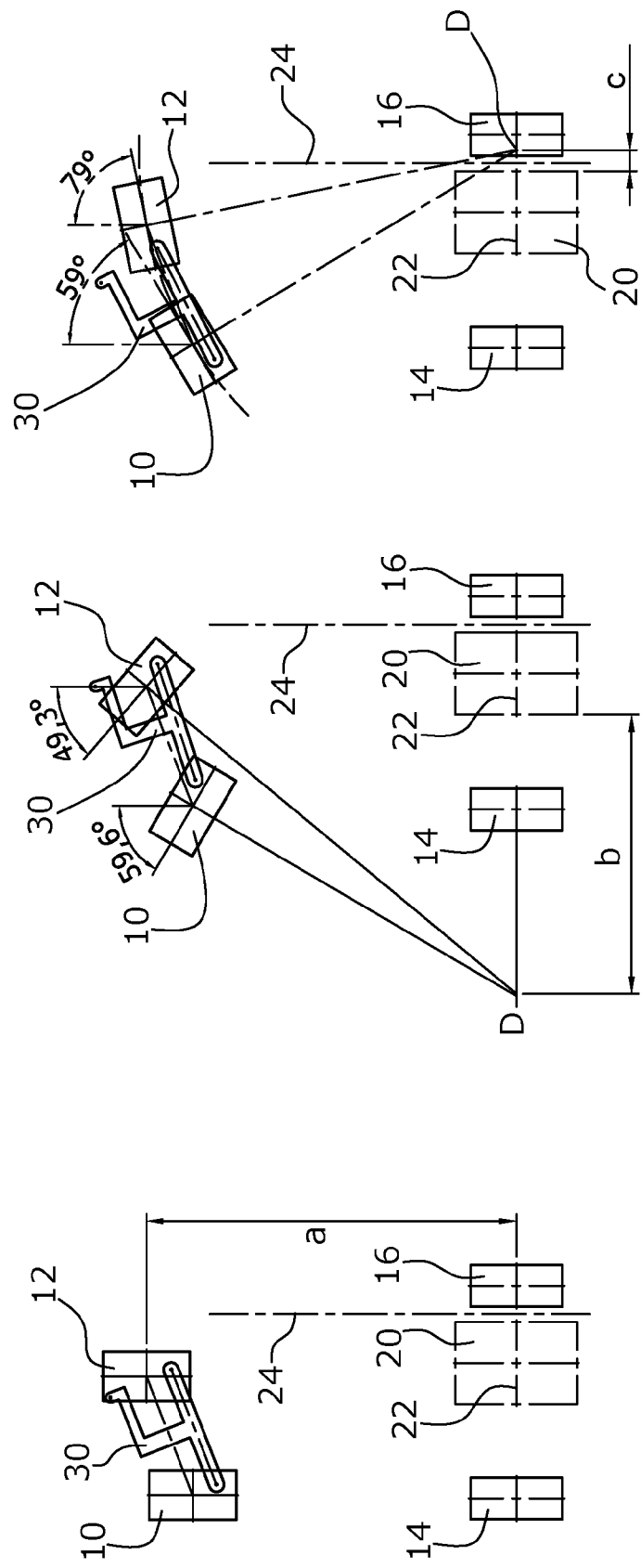

FIG. 7 shows the employment of a steering tie rod 30 in addition to the offset "d" of the front wheels 10, 12, where said steering tie rod 30 allows a larger steering angle at least with regard to the left wheel 10, as can be inferred from the middle illustration of FIG. 7, so that the distance "b" can be reduced further in comparison with FIG. 4.

When steering to the right, the steering angles of both front wheels 10, 12 can be increased further so that the distance "c" can be reduced by approx. 65% in comparison with FIG. 5, thus allowing extremely small bend radii to be milled when steering to the right relative to the zero-clearance side. The distance "c" achieves a dimension of less than 150 mm. A value of, for example, approx. 1700 mm is achievable for "b".

The embodiments according to FIGS. 6 and 7 offer a further advantage in that, when adjusted to the maximum steering angle to the outside as seen from the zero-clearance side, the front wheels 10, 12 can be driven in a more or less similar radius so that the wheels 10, 12 essentially run in the same track.

This arrangement offers the advantage of a more precise cornering procedure.

Maximum steering angles in excess of 70°, preferably between 70° and 90°, can be adjusted.

The embodiment in FIG. 6 shows steering angles of the front wheels 10, 12 of between 55° and 75°, while steering angles of the front wheels of between 59° and 79° can be inferred from the embodiment in FIG. 7.

What is claimed is:

1. A road milling machine for working road or ground surfaces, comprising:
    a machine frame including a lateral outer side;
    left and right front wheels or crawler tracks, and left and right rear wheels or crawler tracks, supporting the machine frame;
    a milling drum supported from the machine frame;
    left and right height adjustable lifting columns connecting the left and right rear wheels or tracks to the machine frame such that a milling depth of the milling drum is adjustable by adjusting a height of the lifting columns;
    left and right pivoting columns connecting the left and right front wheels or tracks to the machine frame, each pivoting column having a pivot axis;
    left and right steering levers connected to the left and right front wheels or tracks, respectively, so as to steer each of the front wheels or tracks in steering angles about the pivot axes of their respective pivot columns;

a steering tie rod including a rigid connecting part and an arm projecting from the connecting part, the connecting part coupling the steering levers of the front wheels or tracks to one another for synchronous adjustment of the steering angles;

at least one steering actuator including a free end coupled to the arm of the steering tie rod to adjust the steering angles; and wherein the front wheels or tracks are steerable between first and second end positions for a direction of travel to the right or left, and the steering tie rod has first and second curved sections configured such that in the first end position the left pivoting column is received in the first curved section and in the second end position the right pivoting column is received in the second curved section.

2. The machine of claim 1, wherein:
the pivoting columns each have a radius; and
the first and second curved sections are configured such that in the end positions the connecting part maintains a distance from the respective pivot axis that is larger than the radius of the respective pivoting column.

3. The machine of claim 1, wherein:
the pivoting columns each have a radius; and
the first and second curved sections of the steering tie rod are located on both sides of the arm where the arm projects from the connecting part, which curved sections face the pivoting columns and are complementary to the radii of the pivoting columns.

4. The machine of claim 1, wherein:
the arm of the steering tie rod projects substantially centrally from the connecting part.

5. The machine of claim 1, wherein:
the at least one steering actuator is a single steering actuator; and
the arm of the steering tie rod extends approximately parallel to the steering actuator on an opposite side of the pivoting columns from the connecting part, and the arm includes a free end connected in an articulated fashion to the steering actuator.

6. The machine of claim 1, wherein:
the pivoting columns each have a radius; and
the arm projecting from the connecting part has a width in a range of from 50% to 97% of a difference between a distance between the pivot axes and the combined radii of the two pivoting columns.

7. The machine of claim 1, wherein:
the pivoting columns each have a radius; and
the arm projecting from the connecting part has a width in a range of from 75% to 95% of a difference between a distance between the pivot axes and the combined radii of the two pivoting columns.

8. The machine of claim 1, wherein:
the left and right steering levers are oriented relative to the pivot axes of the left and right pivoting columns in different angular positions relative to a direction of travel, such that the left and right front wheels or tracks have different maximum steering angles from each other when steered either to the right or to the left.

9. The machine of claim 1, wherein:
the left and right pivoting columns are mounted in a cross member.

10. The machine of claim 9, wherein:
the at least one steering actuator is articulated at a fixed point located on the cross member.

11. The machine of claim 9, wherein:
the cross member is pivotable, relative to the machine frame, about a swing axle extending in the direction of travel.

12. The machine of claim 1, wherein:
the at least one steering actuator is articulated at a fixed point located on the machine frame.

13. The machine of claim 1, wherein:
one of the left or right wheels or tracks is offset in front relative to the other in a direction of travel.

14. The machine of claim 13, wherein:
the one wheel or track offset to the front is on the inside relative to a steering direction.

15. The machine of claim 14, wherein:
the left and right pivoting columns are mounted in a cross member; and
the cross member is pivotable about a vertical axis such that the front wheel or track located on the inside relative to the steering direction can be offset in front relative to the other front wheel or track.

16. The machine of claim 13, wherein:
the milling drum includes an end located substantially flush with the lateral outer side of the machine frame such that the lateral outer side defines a zero-clearance side to enable milling close to obstacles; and
the one wheel or track offset to the front is on the zero-clearance side.

17. The machine of claim 13, wherein the pivot axes of the left and right pivoting columns are offset in a direction of travel by an offset distance in a range of from 50 mm to 350 mm.

18. The machine of claim 17, wherein the offset distance is in a range of from 100 mm to 250 mm.

19. The machine of claim 1, wherein:
at least one of the rear wheels or tracks is steerable.

20. The machine of claim 1, wherein:
the milling drum is supported between the rear wheels or crawler tracks and the milling drum includes an end located substantially flush with the lateral outer side of the machine frame such that the lateral outer side defines a zero-clearance side to enable milling close to obstacles; and
the rear wheel or track located on the zero-clearance side is pivotable inwards, relative to the zero-clearance side, from an outer end position in which the wheel or track is beyond the zero-clearance side and the rear wheels or tracks are aligned, to an inner end position in front of the milling drum.

21. A road milling machine for working road or ground surfaces, comprising:
a machine frame;
left and right front wheels or crawler tracks, and left and right rear wheels or crawler tracks, supporting the machine frame;
a milling drum supported from the machine frame;
left and right height adjustable lifting columns connecting the left and right rear wheels or tracks to the machine frame;
left and right pivoting columns connecting the left and right front wheels or tracks to the machine frame, each pivoting column having a pivot axis and a radius;
left and right steering levers connected to the left and right front wheels or tracks, respectively, so as to steer each of the front wheels or tracks in steering angles about the pivot axes of their respective pivot columns;
a steering tie rod including a rigid connecting part, the connecting part coupling the steering levers of the front wheels or tracks to one another for synchronous adjustment of the steering angles;

at least one steering actuator including a free end coupled to the steering tie rod to adjust the steering angles; and wherein the front wheels or tracks are steerable between first and second end positions for a direction of travel to the right or left, respectively, and the steering tie rod includes first and second curved sections configured such that in the first end position the left pivoting column is received in the first curved section and in the second end position the right pivoting column is received in the second curved section.

22. The machine of claim 21, wherein:

the first and second curved sections are configured such that in the end positions the connecting part maintains a distance from the respective pivot axis that is larger than the radius of the respective pivoting column.

23. The machine of claim 21, wherein:

the left and right steering levers are oriented relative to the pivot axes of the left and right pivoting columns in different angular positions relative to a direction of travel, such that the left and right front wheels or tracks have different maximum steering angles from each other when steered either to the right or to the left.

24. The machine of claim 21, wherein:

the left and right pivoting columns are mounted in a cross member.

25. The machine of claim 24, wherein:

the at least one steering actuator is articulated at a fixed point located on the cross member.

26. The machine of claim 24, wherein:

the cross member is pivotable, relative to the machine frame, about a swing axle extending in the direction of travel.

27. The machine of claim 21, wherein:

the at least one steering actuator is articulated at a fixed point located on the machine frame.

28. The machine of claim 21, wherein:

one of the left or right front wheels or tracks is offset in front relative to the other in a direction of travel.

29. The machine of claim 28, wherein:

the one wheel or track offset to the front is on the inside relative to a steering direction.

30. The machine of claim 29, wherein:

the left and right pivoting columns are mounted in a cross member; and the cross member is pivotable about a vertical axis such that the front wheel or track located on the inside relative to the steering direction can be offset in front relative to the other front wheel or track.

31. The machine of claim 28, wherein:

the milling drum includes an end located substantially flush with a lateral outer side of the machine frame such that the lateral outer side defines a zero-clearance side to enable milling close to obstacles; and the one wheel or track offset to the front is on the zero-clearance side.

32. The machine of claim 28, wherein the pivot axes of the left and right pivoting columns are offset in a direction of travel by an offset distance in a range of from 50 mm to 350 mm.

33. The machine of claim 32, wherein the offset distance is in a range of from 100 mm to 250 mm.

34. The machine of claim 21, wherein:

at least one of the rear wheels or tracks is steerable.

35. The machine of claim 21, wherein:

the milling drum is supported between the rear wheels or crawler tracks and the milling drum includes an end located substantially flush with a lateral outer side of the machine frame such that the lateral outer side defines a zero-clearance side to enable milling close to obstacles; and the rear wheel or track located on the zero-clearance side is pivotable inwards, relative to the zero-clearance side, from an outer end position in which the wheel or track is beyond the zero-clearance side and the rear wheels or tracks are aligned, to an inner end position in front of the milling drum.

* * * * *